Patented Feb. 21, 1928.

1,659,782

UNITED STATES PATENT OFFICE.

ROBERT C. MORAN, OF WOODBURY, NEW JERSEY, ASSIGNOR TO VACUUM OIL COMPANY, OF NEW YORK, N. Y., A CORPORATION OF NEW YORK.

PURIFICATION OF PETROLEUM OILS FOR REMOVAL OF SULPHONATED COMPOUNDS.

No Drawing.    Application filed February 23, 1927.  Serial No. 170,422.

The present invention relates to the further purification of petroleum oils or distillates which have been subjected to the action of sulphuric acid for the removal of undesirable constituents.

When petroleum distillates, particularly the lubricating fractions, are treated with strong or fuming sulphuric acid for the purpose of obtaining pale or water-white products, there occurs a formation of sulphonic acid compounds, some of which are soluble in the oil in the presence of acqueous sludge and, consequently, are not removed therewith. When the acid-treated oil is subjected to treatment with an alkali, the alkali-metal derivatives or "soaps" of such oil-soluble organic sulphonic acids are formed which likewise are soluble in the oil. The water washing of such acid-treated oils, whether or not they have been previously treated with alkali, leads to the formation of emulsions of a more or less permanent character which are difficultly separable from the oils. The removal of oil-soluble sulphonic acids or their alkali-metal derivatives from the acid-treated oils by means of water or alkali solutions in the usual manner is therefore impracticable.

A further objectionable feature of oil-soluble organic sulphonic acids or their soaps is that, when present in an oil they interfere seriously with the filtration of such an oil; a matter of importance particularly in the case of the manufacture of white oils.

For the removal of oil-soluble organic sulphonic acids from an acid-treated oil, various methods have been proposed which involve extraction of the acid-treated oil with various water-soluble compounds such as methyl alcohol, ethyl alcohol, isopropyl alcohol, acetone and glycerine, respectively.

These water-soluble extraction media, with the exception of glycerine, are employed in the form of aqueous solutions, preferably in the case of the alcohols and necessarily in the case of acetone. The application of these extraction media, excepting glycerine, in the aqueous as compared with the non-aqueous form is advantageous in that the solubility of the acid-treated oil in the extraction medium and vice-versa is reduced, and, furthermore, in that the separation of the oil and extraction medium is subsequently facilitated because of the increased gravity differential between the oil and the extraction medium brought about by the admixture of water with the latter. This latter point is of considerable importance from a technical standpoint.

Glycerine when used in aqueous solution must be of glycerine strength greater than 80% in order to obtain satisfactory results. It is preferably used in as concentrated a form as practically available; a procedure made possible by the facts (1) that glycerine is substantially if not entirely immiscible with the oil and (2) that a separation of the oil and the glycerine solution of sulphonic acids and/or their soaps is readily obtained because of the much higher gravity (1.269 at 0° C.) of glycerine, provided heat be applied to overcome the effect of the natural viscosity of the glycerine.

I have found that ethylene glycol and aqueous solutions thereof may be utilized advantageously for the removal of oil-soluble sulphonic acid and/or their soaps from petroleum distillates which have been subjected to the action of strong or fuming sulphuric acid.

I have also found that admixture of ethylene glycol with methyl alcohol and/or ethyl alcohol and/or isopropyl alcohol, and/or glycerine and/or acetone in the form of aqueous or substantially non-aqueous solutions are also technically-applicable extraction media for oil-soluble sulphonated compounds.

Ethylene glycol is substantially, if not entirely immiscible with petroleum distillates. Consequently, the use of ethylene glycol for the removal of oil-soluble sulphonated compounds from an acid-treated oil is advantageous, as compared with the similar use of methyl alcohol, ethyl alcohol, isopropyl alcohol or acetone, in that substantially no loss of the extraction medium through solution in the oil takes place. Furthermore, because of its specific gravity (1.127 at 0° C.), separation of the ethylene glycol solution of sulphonated compounds from the oil by settling is more readily obtained than when methyl alcohol or ethyl alcohol or isopropyl alcohol or acetone in aqueous or non-aqueous solution are similarly employed.

As compared with glycerine, ethylene glycol is more advantageous in that it is much less viscous, so that separation by settling is more readily obtained at ordinary temperatures. Furthermore, its boiling point of 197.2° C. as compared with 290° C. for glycerine is an advantageous feature from the standpoint of subsequent recovery.

The admixture of ethylene glycol instead of water with methyl alcohol and/or ethyl alcohol and/or isopropyl alcohol and/or acetone results in the production of a greater gravity differential between the oil and the solution of sulphonated compounds and, therefore, tends to more rapid separation by settling. To a lesser degree this advantage holds when ethylene glycol is partially substituted for water in aqueous mixtures of methyl alcohol and/or ethyl alcohol and/or isopropyl alcohol and/or acetone.

In illustration of my invention I will describe the application of ethylene glycol for the removal of sulphonated compounds from an acid-treated oil. A petroleum distillate of about 28° Bé. 400° F. flash and 300 viscosity (104° F.) is treated with 80% of 20% fuming sulphuric acid, the treatment being made in eight successive dumps of 10% acid each and the sludge separated from the oil after each dump, for the production of an essentially non-sludging oil. The acid-oil is then treated with ethylene glycol, for example, by mixing it with 8% by volume of commercial ethylene glycol (dynamite-grade containing 0.3% to 0.5% water). After thorough agitation, the mixture is allowed to settle. The ethylene glycol containing the oil-soluble sulphonated compounds in solution is drawn off and the oil at once filtered with clay.

The ethylene glycol solution of the oil-soluble sulphonic acids may be treated for the recovery of the ethylene glycol, for example, by distillation under reduced pressure.

The process of the present invention has been described above as applied to an oil which has been subjected to a very "heavy" acid treatment. It may also be applied to oils which have been less heavily treated with fuming sulphuric as well as to oils which have been subjected to treatment with 66° Bé. sulphuric acid. The process may likewise be applied to such acid-treated oils after conversion of the oil-soluble sulphonic acids to their alkali-metal derivatives or soaps. When thus applied, the ethylene glycol solution of the soaps is preferably treated with enough sulphuric acid to make it neutral previous to recovering the ethylene glycol in order to obviate loss of ethylene glycol through polymerization which is likely to occur if the alkaline ethylene glycol mixture alone be subjected to the heat of the still.

In the above illustration, 8% by volume of ethylene glycol is specified. However, more or less than this amount may be used without departing from the spirit of the invention. Furthermore, for the concentrated form of ethylene glycol specified above, may be substituted, in like proportions and with good results, aqueous solutions containing more than 60% ethylene glycol, and also aqueous or non-aqueous admixtures of ethylene glycol with methyl alcohol and/or ethyl alcohol and/or isopropyl, and/or glycerine and/or acetone.

What I claim as my invention and desire to secure by Letters Patent is:

1. The process of purifying acid-treated petroleum oils which consists in admixing ethylene glycol therewith and subsequently separating the ethylene glycol therefrom, thereby removing sulphonated compounds from the oil.

2. The process of purifying acid-treated petroleum oils which consists in admixing an aqueous solution of ethylene glycol therewith and subsequently separating the ethylene glycol solution therefrom, thereby removing sulphonated compounds from the oil.

3. The process of purifying acid-treated petroleum oils which consists in admixing therewith ethylene glycol solutions of ethyl alcohol, and subsequently, separating said ethylene glycol solutions therefrom, thereby removing sulphonated compounds from the oil.

4. The process of purifying acid-treated petroleum oils which consists in admixing therewith aqueous ethylene glycol solutions of ethyl alcohol, and subsequently separating said ethylene glycol solutions therefrom, thereby removing sulphonated compounds from the oil.

5. The process of purifying acid-treated petroleum oils which consists in neutralizing said distillates with alkali, then admixing ethylene glycol therewith and subsequenty separating the ethylene glycol therefrom, thereby removing sulphonated compounds from the oil.

6. The process of purifying acid-treated petroleum oils which consists in neutralizing said distillates with alkali, then admixing an aqueous solution of ethylene glycol therewith and subsequently separating the ethylene glycol solution therefrom, thereby removing sulphonated compounds from the oil.

7. The process of purifying acid-treated petroleum oils which consists in neutralizing said distillates with alkali, then admixing therewith ethylene glycol solutions of ethyl alcohol, and subsequently separating said ethylene glycol solutions therefrom, thereby removing sulphonated compounds from the oil.

8. The process of purifying acid-treated petroleum oils which consists in neutralizing said distillates with alkali, then admixing therewith acqueous ethylene glycol solutions of ethyl alcohol, and subsequently separating said ethylene glycol solutions therefrom, thereby removing sulphonated compounds from the oil.

9. The process of purifying acid-treated petroleum oils which consists in admixing therewith 5-10% of ethylene glycol containing less than 1% of water, and subsequently separating the ethylene glycol therefrom, thereby removing sulphonated compounds from the oil.

10. The process of purifying acid-treated petroleum oils which consists in admixing therewith 8% of ethylene glycol containing less than 1% of water, and subsequently separating the ethylene glycol therefrom, thereby removing sulphonated compounds from the oil.

11. The process of preparing a refined hydrocarbon oil which consists in subjecting a lubricating oil fraction to successive treatment with fuming sulphuric acid, removing the treated oil, admixing therewith 8% of ethylene glycol containing less than 1% of water and subsequently separating the ethylene glycol therefrom, thereby removing sulphonated compounds from the oil.

ROBERT C. MORAN.